July 18, 1950 A. H. BUCKLEY 2,515,492

CRYPTOGRAPHIC APPARATUS

Filed March 18, 1948 5 Sheets-Sheet 1

INVENTOR.
Arthur H. Buckley
BY
L. F. Hammond
Atty.

July 18, 1950 A. H. BUCKLEY 2,515,492

CRYPTOGRAPHIC APPARATUS

Filed March 18, 1948 5 Sheets-Sheet 2

INVENTOR.
Arthur H. Buckley
BY
L. F. Hammond
Atty.

July 18, 1950 A. H. BUCKLEY 2,515,492

CRYPTOGRAPHIC APPARATUS

Filed March 18, 1948 5 Sheets-Sheet 3

INVENTOR.

Arthur H. Buckley

BY

L. F. Hammond.

Atty.

July 18, 1950 A. H. BUCKLEY 2,515,492

CRYPTOGRAPHIC APPARATUS

Filed March 18, 1948 5 Sheets-Sheet 4

INVENTOR.

Arthur H. Buckley

BY

L. F. Hammond

Atty.

July 18, 1950 A. H. BUCKLEY 2,515,492

CRYPTOGRAPHIC APPARATUS

Filed March 18, 1948 5 Sheets-Sheet 5

INVENTOR.

Arthur H. Buckley

BY

L. F. Hammond.

Atty.

Patented July 18, 1950 2,515,492

UNITED STATES PATENT OFFICE 2,515,492

CRYPTOGRAPHIC APPARATUS

Arthur H. Buckley, Chicago, Ill.

Application March 18, 1948, Serial No. 15,591

7 Claims. (Cl. 197—4)

The present invention relates to a cryptographic apparatus and discloses a cryptographic device comprising an improvement over the apparatus shown in my prior Patent Number 2,377,205, issued May 29, 1945.

The earlier patent disclosed that, by the combination of an electric typewriting machine with a code tape and a bank of permutation relays governed by the tape, it is practicable to type a message in plain text on the keyboard of the machine and yet have it automatically enciphered, so that cryptographic messages can be typed at ordinary typing speeds.

It was also pointed out that, by the use of such a machine, a message may be encoded in a manner utilizing only the twenty-six letters of the alphabet, so that the crytogram may be transmitted by other means and may be typed or copied on an ordinary typewriter, teletype machine or printing telegraph, for example. In addition to the above, it is to be noted that these results are accomplished by an enciphering system wherein any character of the twenty-six letters of the alphabet may be translated into any one of the other twenty-five characters, or may remain unchanged, in accordance with the functioning of the encoding circuits; and yet wherein the frequency of recurrence of a given character in enciphered messages will bear no relationship to the frequency of recurrence of characters in the plain text, so that commonly practiced methods of deciphering the cryptogram by the use of recurrence tables will be useless.

It is the primary object of the present invention to provide a cryptographic apparatus wherein all of the objects of the invention disclosed in my previous patent are accomplished, yet wherein the number of parts and the complexity of the encoding circuits are greatly reduced.

A further object is to provide cryptographic equipment, wherein the effective length of the enciphering key so greatly exceeds the length of any message or series of messages transmitted that cyclic repetition of the key will not take place. In this connection, it may be explained that the effectiveness of enciphered messages comes under two categories. In the first, the secrecy of the message can be maintained against the wiles and practices of cryptographers for sufficient duration of time to make their decipherment unimportant; but the codes may eventually be deciphered. In the second, the messages are enciphered by a means so obscure that decipherment without foreknowledge is beyond the realm of methematical possibility. So far as known, the latter result is obtainable only by the employment of an enciphering key of sufficient length so that cyclic repetition of the key never takes place.

The present apparatus is of the second category, since it can be shown that the cryptographic apparatus of this disclosure will encipher messages continuously over a period of years without any cyclic repetition of the enciphering key, and this without change or alteration of the relatively short coding records employed. This is accomplished by the use of a key comprising a plurality of relatively short endless code tapes, arranged for automatic self-permutation; so that the effective length of the key is almost infinite, and cyclic repetition of the key will not take place even after continuous use over a long period of years.

It will also become apparent from the following description that when ordinary precautions are taken in the use and storage of the equipment here disclosed, the decipherment of messages without foreknowledge of the particular encipherment procedure will be entirely impractical, even though the physical equipment required to accomplish the purpose may have fallen into the hands of cryptographers seeking to break the code.

This object is accomplished by the provision of a cryptographic apparatus of the general type indicated, including a combination of switches having multiple possible positions of which only one is capable of effecting decipherment of the cryptographic messages, so that the entire apparatus may be disabled, as far as persons without foreknowledge of the proper procedure are concerned, by merely setting the switches to a position other than the designated one.

A still further object of the invention resides in the provision of a cryptographic apparatus to encode messages simultaneously with the typing thereof, and at the same time automatically break down the encoded message to spaced groups of several letters only, so that the transmission of the message by other means is facilitated.

These and other objects are accomplished by the teachings of the present disclosure, wherein a present preferred embodiment of the invention is illustrated in the drawings attached to and forming a part of this specification. In the drawings, Figure 1 is a fragmental sectional view of an electric typewriting machine modified in accordance with the teachings of this disclosure;

Figures 8, 9, 10, 11, 15:
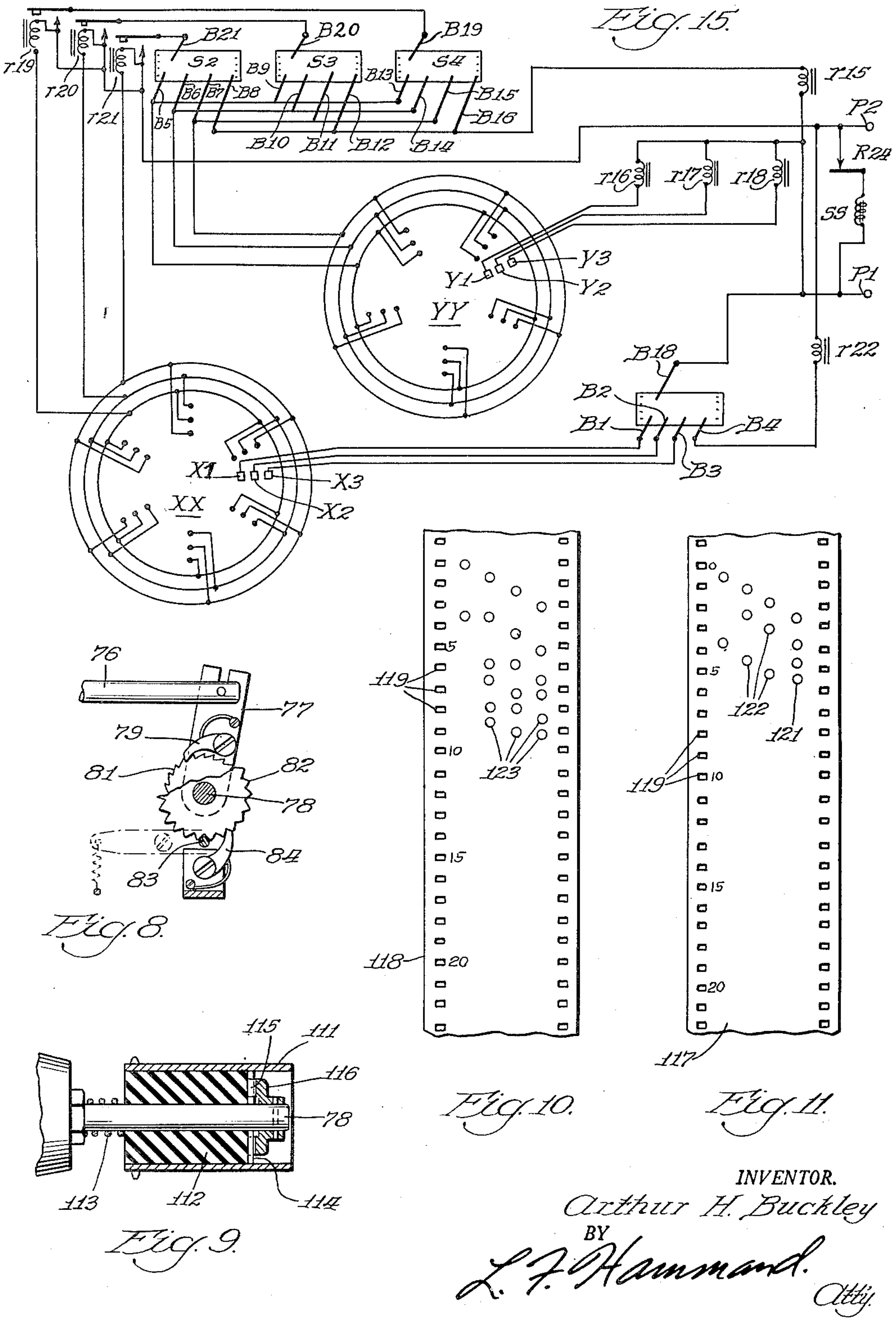
Figure 8 is a detail sectional view of the solenoid-actuated advancing ratchet of the tape driving unit, the view being taken substantially on the plane of the line 8—8 of Figure 7.
Figure 9 is a detail sectional view of one of the tape advancing sprockets and is taken substantially on the plane of the line 9—9 of Figure 7.
Figure 10 is a face view of one of the three enciphering tapes.
Figure 11 is a face view of a selector tape, by which one of the enciphering tapes is energized.
Figure 13:
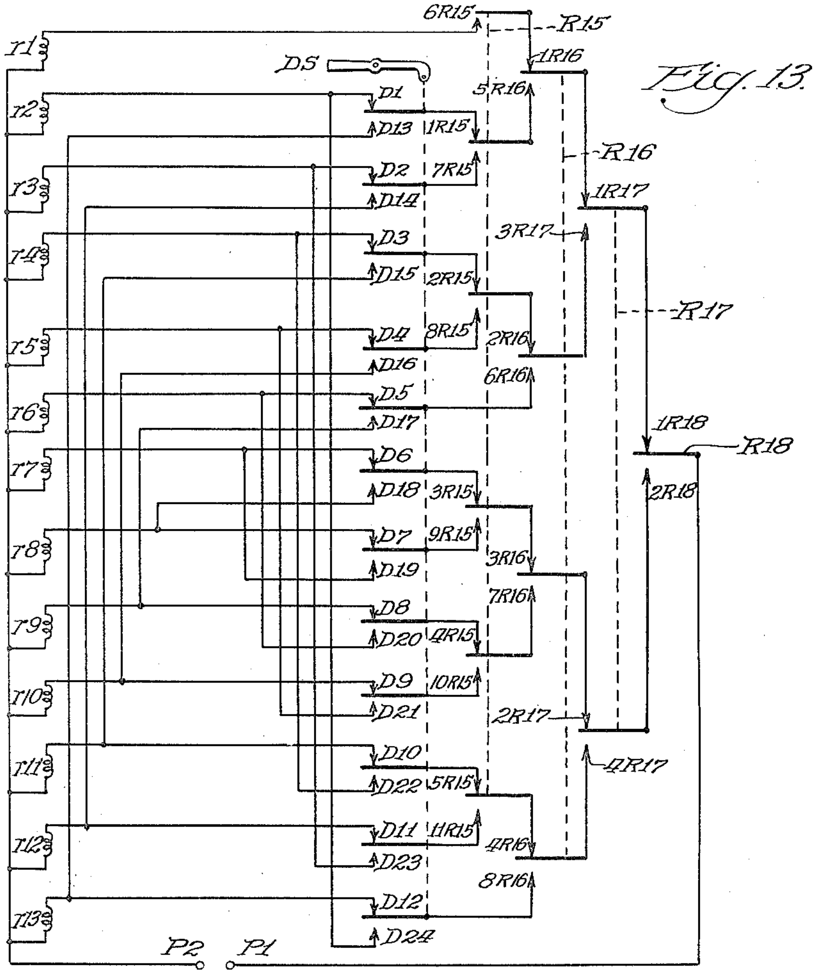
Figure 13 is a schematic diagram of the permutably operable contactors and the windings of the circuit selector contactors.
Figure 14:
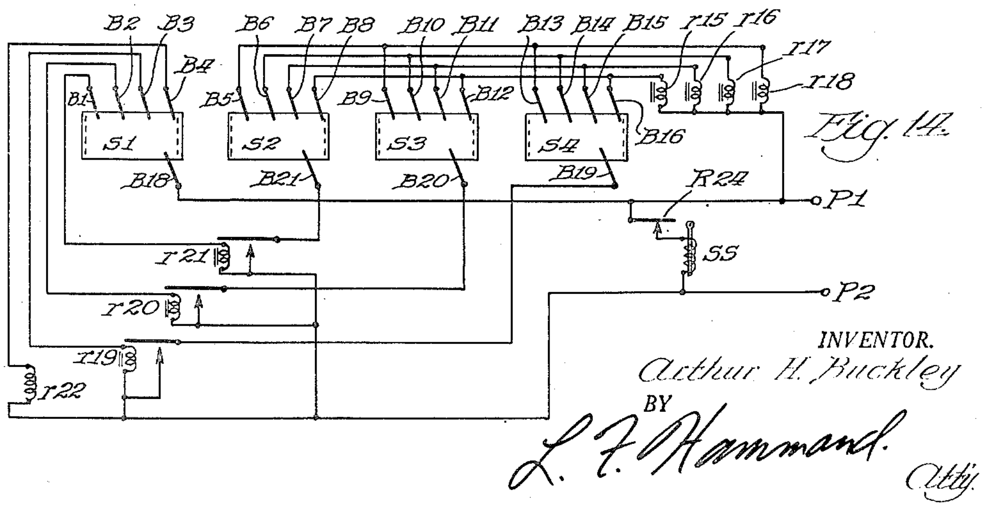

Figure 14 is a schematic wiring diagram of the circuit of the enciphering tape circuit, showing the relationship between the sprockets of the selector tape, the enciphering tapes and the windings of the permutably operable contactors of Figure 13; and Figure 15 is a schematic wiring diagram of a slightly modified embodiment of the arrangement shown of Figure 14, wherein combination switches are included in the disabling circuit of the machine while retaining all mechanical parts in their proper functioning relationship.

In this apparatus, as in the apparatus disclosed in my earlier patent, the principles of the invention are most conveniently practiced by the employment of an electric typewriting machine having appropriate additions and modifications to its structure. The type of machine most conveniently used for this purpose includes a frame 10 and a type basket 11, in which a multiplicity of type bars 12 are mounted on the pivot rod 13. These type bars 12 are power actuated, but their movement is initiated by a multiplicity of key bars 14, each mounted on a pivot rod 15 and having a downwardly extending arm 16 to trip a latch 17 on a double cam 18. When any one of the latches 17 releases, the corresponding cam 18 will move under spring tension and engage the rotating driving roll 19 of the machine. When the roll and cam engage, the spiral shape of the cam surface functions to move the cam to the left, and rock the arm 21 on which the cam is mounted around its supporting pivot 22. This motion will draw downwardly on the link 23, and rock the crank 24 about the pivot 15 and swing the arm 25 of the crank to the right, as viewed in the drawings. The motion of the arm 25 acts through the link 26 and the locking toggle 27—28 to cause the type bar 12 to swing upwardly and strike the platen 29. The crank 24—25 is also provided with an arm 31, which underlies a plate 32 pivoted on the cross rod 33, so that each time any one of the keys is actuated the plate 32 and rod 33 will be rocked in a short counter-clockwise stroke. This motion is utilized to advance the platen of the machine as the typing progresses.

In order to suit presently manufactured forms of electric typewriting machines to the objects of the present invention, I have found it advisable to modify their structure by providing, in place of the usual platen, the small rotating platen 29. This may conveniently be carried on a shaft 36 in bearings (not shown) and driven from a shaft 37 through a pair of bevel gears 38 and 39. A pair of idler rolls 34 are provided to hold a narrow paper tape against the platen 29, so that it will advance with its rotation. The shaft 37 is rotated in step-by-step movement to advance the tape after every letter types. For this purpose, a ratchet wheel 41 is provided on the shaft 37. The ratchet wheel is of double form, with closely spaced teeth 42 on one side, and widely spaced teeth 43 on the opposite side. The ratchet teeth 42 are engaged by a dog 44, pivoted on an arm 45 carried on the shaft 37. This arm and dog are actuated by a link 46 extending downwardly to a lever 47, which is carried by the pivot rod 15 and positioned against the upper edge of the rocker plate 32, so that each stroke of counter-clockwise rocking movement of the plate will advance the ratchet 41 a distance of one tooth. The ratchet teeth 43 are similarly actuated by a dog 48, carried by the arm 49 on the shaft 37. The dog 48 is actuated by a link 51 extending downwardly to the outer end of a lever 52, mounted on the pivot rod 15 beside the lever 47. It is to be noted, however, that the lever 52 is somewhat longer than the lever 47, so that the stroke of the dog 48 is correspondingly greater than the stroke of the dog 44. Thus, by properly spacing the teeth 42 and the teeth 43, a means is provided whereby the ratchet assembly will automatically double-space at fixed intervals. That is, the dog 44 will normally engage the teeth 42 to move the distance of one of the teeth in response to every key stroke of the machine. The stroke of the dog 48 is of greater length, but merely slides on the outer arcuate surfaces between the teeth 43 and so is not effective to advance the ratchet. When one of the teeth 43 of the more widely spaced ratchet comes into operative position, however, it will be engaged by the dog 48 and the assembly will be moved a distance equal to the spacing between two of the teeth 43. Thus, the platen will advance a single space five times, followed by an advance of two spaces; and any message typed on the machine will be automatically broken into five-letter groups, as indicated on the face view of the coded tape, shown in Figure 2.

The conventional electric typewriting machine employed in this invention is also modified by the provision of an auxiliary keyboard, so that the type bars are not actuated directly from the keys, but instead are actuated electrically through an electrical system arranged to automatically translate a plain text message into a cryptogram as it is typed. The auxiliary keyboard KB (Figure 12) has a multiplicity of key bars 55 on which the keys 56 are carried, and these key bars are arranged to actuate a set of electrical contacts, so that the key bars themselves do not move the key bars 14, but instead act through the electrical system to selectively energize any one of a bank KS (Figure 12) of key solenoids 57 of Figure 1.

In taking up the explanation of the keyboard and its contactors, attention is called to the fact that, in a typewriter having a standard keyboard, the keys are not arranged in alphabetical order but instead are arranged with the keys corresponding to the twenty-six letters of the alphabet carried by type bars in the order Q A Z W S X E D C R F V T G B Y H N U J M I K O L P, from left to right across the keyboard. The keyboard contacts and key solenoids are accordingly indicated in these positions in Figure 12, as well as in Figures 1 and 4.

The keyboard is provided with two separate, but coacting sets of key contacts. The first set comprises thirteen pairs of electrical contacts generally indicated by the ordinal 58 in Figure 1, with the several contacts of the set identified by the letters Q Z S E C F T B H U M K O in Figure 12. Each of these contacts is arranged to be closed by either of a pair of adjacent key bars, however, so that actuation of the key A will close the contacts Q, while actuation of the key W will close the contacts Z, and similarly depressing any one of the keys X D R V G Y N J I O or P will close the corresponding contacts S E C F T B H U M K or L, respectively.

The keyboard is also provided with a second set of contacts, which may be designated as circuit splitting control contacts. These contacts comprise a single pole double throw switch wherein the center contactor 61 is normally closed with the contact 62, but is arranged to be moved to open with contact 62 and close with contact 63 in response to actuation of any one of the alternate keys A W X D R V G Y N J I O P. This is conveniently done by providing a crossbar 64 having raised bosses 65 underlying the above-designated key bars and notches 66 to clear the key bars Q, Z, S, E, etc. Thus, if the key A is depressed, for example, the contacts Q will be closed and the crossbar 64 will move contact 61 to break with the contactor 62 and engage contact 63. If the key Q is depressed, the contacts Q close in the identical manner, but in this case the key bar falls into one of the notches 66 of the crossbar 64, and the contactor 61 is not actuated. Thus, although the keyboard utilizes twenty-six keys and corresponding key bars, it requires only fourteen shiftable contacts to complete the necessary electrical circuits.

It has been mentioned in the introduction of this disclosure that the present machine contemplates the use of a plurality of coded record tapes, so arranged that any one of several enciphering tapes may be employed at a given instant, and the selection between the several code tapes is governed by a similar perforated tape actuating a plurality of permutably operable contactors. To this end a tape feeding mechanism, illustrated in Figures 6 to 9, is provided so that three enciphering tapes, such as the tape illustrated in Figure 10, may be employed and the mechanism shifted indiscriminately from one of these tapes to another by a selector tape, such as illustrated in Figure 11.

The tape advancing mechanism includes a frame shown as having opposite mounting plates 71 and 72, joined by top and bottom plates 73 and 74. The inner face of the plate 71 carries a solenoid 75 having an operating rod 76 extending to a lever 77, which is pivoted on a sprocket shaft 78 (Figure 8). The lever 77 carries a spring urged dog 79 to advance a ratchet wheel 81 one tooth for each stroke of the solenoid, and a notched detent wheel 82 and spring urged detent roller 83 are provided to prevent overtravel and to position the sprockets on the shaft 78 at the exact angular position desired. A dog 84 may also be provided to prevent return movement of the sprockets.

The sprocket shaft 78 extends through suitable bearings 85 and 86 in the plates 71 and 72, and carries a pair of sprockets S1 and S2 at its opposite ends. The mechanism includes a second pair of sprockets S3 and S4, which are mounted on a shaft 94, geared to the shaft 78 by the gears 95, 96, 97 and 98, so that all of the sprockets advance one notch in response to one stroke of the solenoid 75. Each of the sprockets is also provided with a pair of spring urged pressure rolls 101 and 102, carried on arms 103 and 104 pivoted on the studs 105. Each pair of pressure roll arms is bridged by a spring 106 to urge the rolls against the sprockets and maintain the tapes in snug surface engagement with the sprockets.

The sprockets each include a metallic sleeve 111 (Figure 9), mounted on an insulating bushing 112 and urged axially of the shaft 78 by a coiled compression spring 113. The bushings include end notches 114, however, normally engaging by corresponding notches 115 on clutch wheels 116 fixed to the end of the shafts 78 and 94, so that the sprockets rotate with the shafts. Thus, the sprockets will normally turn with the shafts, and each sprocket will drive a separate perforated tape which may be in the form of endless loops 117 and 118 of ordinary motion picture film, but having coded perforations. The tapes include sprocket holes 119, and are also perforated with code perforations 121, 122 and 123 in the manner shown in Figures 10 and 11, so that a series of brushes B1, B2, B3 and B4 are adapted to engage the metal surface of the sleeve 111 through the perforations 121 and 122 of the tape 117. The sprockets S2, S3 and S4 are provided with similar sets of brushes B5 to B16, and each sprocket also has a single brush B18, B21, B20 and B19 positioned on the opposite side of the sprocket to engage the surface of the metal and sleeve 111 directly and complete the circuit.

It will be understood, of course, that any one of the sprockets may be utilized to carry the selector tape (Figure 11), but for purposes of convenience it will be assumed that the selector tape is carried by the sprocket S1, and that three similar but different enciphering tapes of Figure 10 are carried by the sprockets S2, S3 and S4, respectively. Thus, the brushes B1, B2 and B3 may complete circuits through the three rows of tape selection perforations 122, while the brush B4 works through a separate row of perforations 121 to actuate a circuit-splitting contactor. The brushes B5, B6, B7 and B8 and the brush B21 establish connections with the sprocket S2, while the brushes B9, B10, B11, B12 and B20 establish connections through the sprocket S3. Similarly, the brushes B13, B14, B15, B16 and B19 coact to establish a circuit through the code tape on the sprocket S4.

Figure 12:
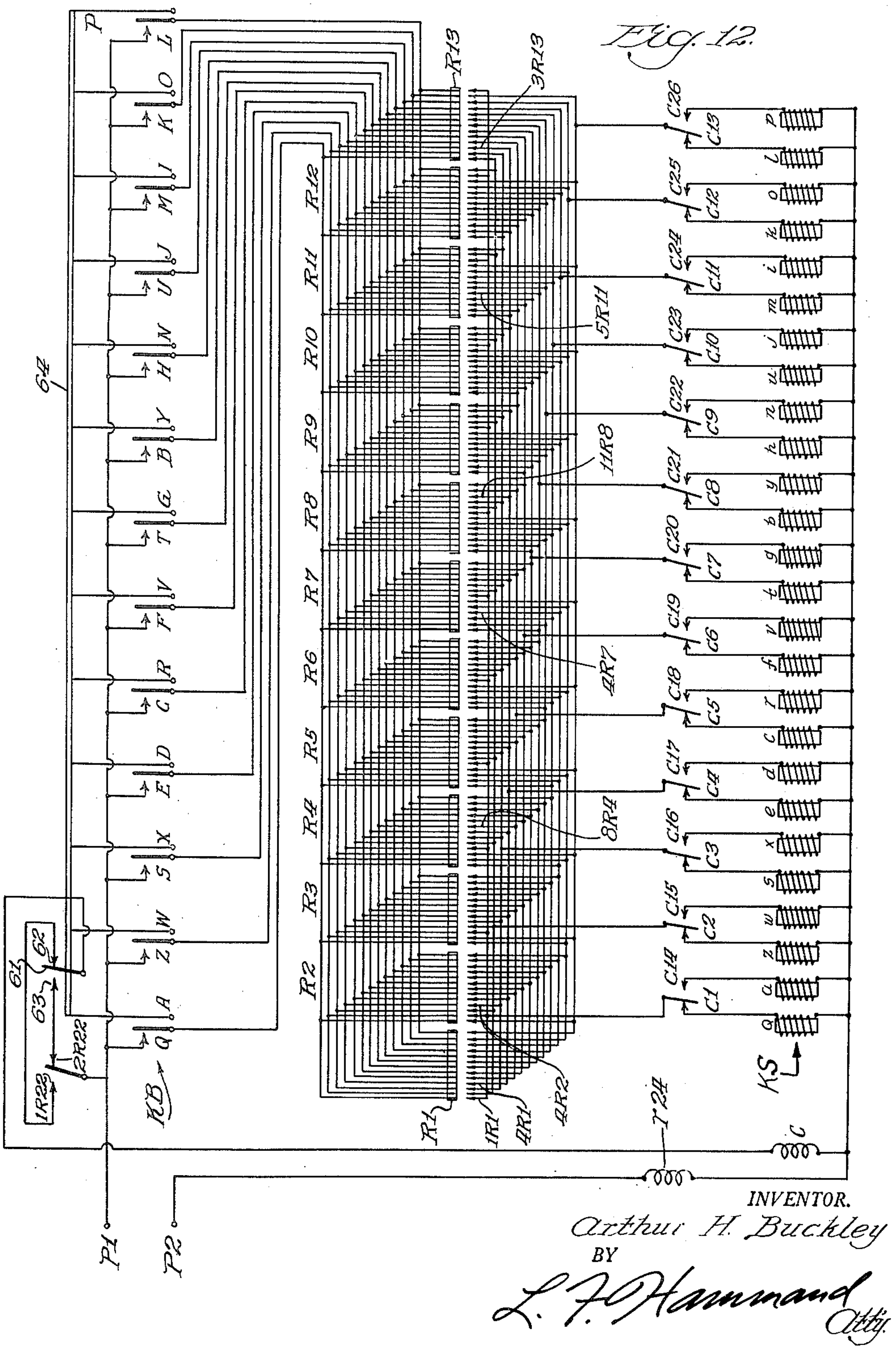
Figure 12 is a schematic wiring diagram of a portion of the circuit including the keyboard contacts, the circuit selector contactors, the circuit splitting contactor and the key actuating solenoids.

The operation of the mechanism is best described in connection with Figures 12, 13 and 14, which disclose the electrical circuits employed. Figure 12 is an illustration of the portion of the circuit extending from the bank of keyboard contacts KB through a bank of circuit selection contactors and a circuit-splitting control relay to the bank of key-actuating solenoids KS. In this circuit the solenoid windings for the various letters of the alphabet are indicated by lower case letters q a z w s x e d c r f v t g b y h n u j m i k o l p, while the manually operable keys are indicated by the upper case letters Q A Z W S X E D C R F V T G B Y H N U J M I K O L P. It will be remembered, of course, that these keys act in pairs as heretofore noted, and that the contact 61 is mechanically actuated by the key bars A W X D R V G Y N J I O and P.

The contactor 61 is connected to the winding C of a circuit-splitting contactor having normally closed contacts C1 to C13, inclusive, and normally open contacts C14 to C26, inclusive, but arranged to open the contacts C1 to C13, inclusive, and close contacts C14 to C26, inclusive, when the winding C is energized.

The circuit selection contactors are generally indicated by the numerals R1 to R13, inclusive, and each of these contactors includes thirteen pairs of contacts. These will be referred to herein in the order they appear from left to right in the figure; that is, the first contact of relay R1 will be designated 1R1, the second 2R1, the third 3R1, etc. and thus through the entire series to the last contact 13R13 at the extreme right of the figure. These reference characters will be omitted, however, except in connection with the examples of operation discussed, to avoid overcrowding the figure. The several contactors R1 to R13, inclusive, are each independently energized by the windings r1 to r13, inclusive, shown in Figure 13. Similarly, the circuit of Figure 12 includes a pair of code operated circuit-splitting control contacts 1R22 and 2R22 actuated by the winding r22 of Figure 14. The contacts 1R22 are normally open, and contacts 2R22 normally closed, but both sets reverse position upon energization of the winding r22. The circuit of Figure 12 also includes a winding r24 which, when energized, will open the normally closed contacts R24 of Figure 14.

The circuit of Figure 13 includes the windings r1 to r13, inclusive, each connected to the power supply through a decoding switch DS and a set of four permutably operable contactors R15, R16, R17 and R18, actuated by the corresponding winding r15, r16, r17, and r18 of Figure 14. The contacts of the permutation relay R15 comprise a six-pole switch having normally closed contacts 1R15 to 5R15, inclusive, and normally open contacts 6R15 to 11R15, inclusive. The permutation relay R16 comprises a four-pole switch having closed contacts 1R16 to 4R16, inclusive, and normally open contacts 5R16 to 8R16. The relay R17 is a double pole, double throw relay having normally closed contacts 1R17 and 2R17, and normally open contacts 3R17 and 4R17, while the relay R18 is of the single pole, double throw type having normally closed contacts 1R18 and a pair of open contacts 2R18. The relays R15 to R18, inclusive, act in various permutations governed by the enciphering tapes, to complete a circuit from the power supply to any one of the contacts of the decoding switch DS. This is a manually operated twelve-pole double throw switch, in which the contacts D1 to D12, inclusive, are closed when messages are to be encoded, and contacts D13 to D24 are closed for deciphering.

In the tape selector circuit (Figure 14) the single brush B18 of the sprocket S1 is connected directly to power supply line P1 so that the other brushes B1, B2, B3 and B4 may be energized to select the code tape to be used by selectively energizing one of the sprockets S2, S3 and S4. To this end, the brushes B1, B2, B3 and B4 are connected respectively through the windings r21, r20, r19 and r22 to the opposite side P2 of the power supply line. Each of the relays r21, r20 and r19 includes normally open contacts leading direct to the brushes B21, B20 and B19, so that any one of the sprockets S2, S3 or S4 will be energized on actuation of the corresponding relay winding. The winding r22 controls the circuit-splitting contacts 1R22 and 2R22 of Figure 12. Contacts R24 are under control of the winding r24 of Figure 12, but are normally closed to complete a circuit from the power supply line P1 through the stepping relay SS and to the opposite side P2 of the power line.

The operation of the apparatus in converting a message in plain text to cipher is best explained by tracing the operations in the order in which they take place. For this purpose, reference is made to Figures 12, 13 and 14. In these figures the various contacts are shown in their normal or starting positions, wherein all of the relay windings are deenergized and the contacts are open or closed, as indicated in the diagrams. The stepper solenoid SS is the only winding energized at the beginning of the operation.

Figures 1, 2, 3, 4, 5:
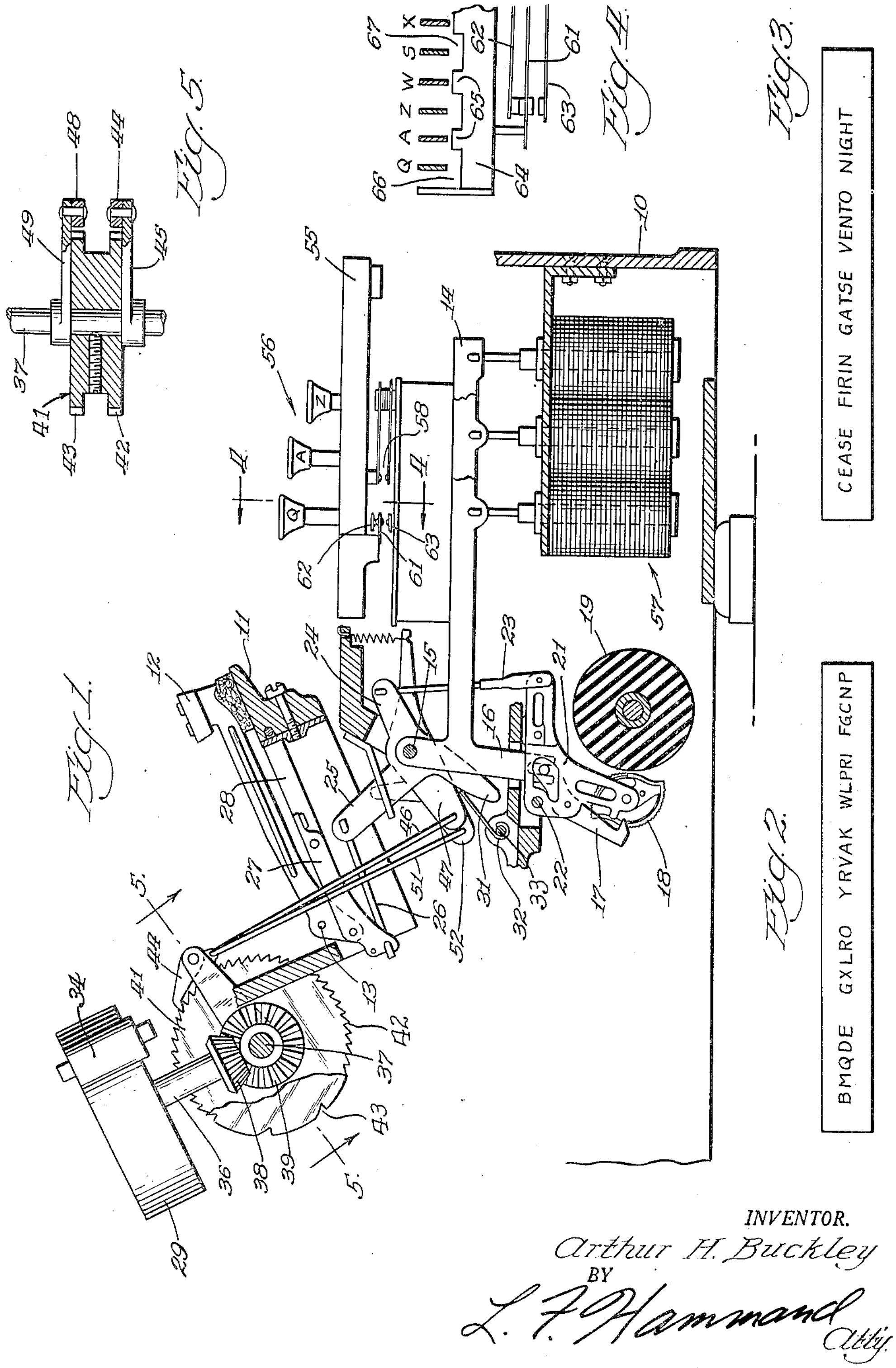
Figure 2 is a face view of a strip of paper tape on which a typical cryptographic message is represented.
Figure 3 is a face view of a strip of tape showing the appearance of the message of Figure 2, after deciphering.
Figure 4 is a detail sectional view of the keyboard contacts, and is taken substantially on the plane of the line 4—4 of Figure 1.
Figure 5 is a detail sectional view of the tape advancing ratchet taken substantially on the plane of the line 5—5 of Figure 1.
Figure 6:
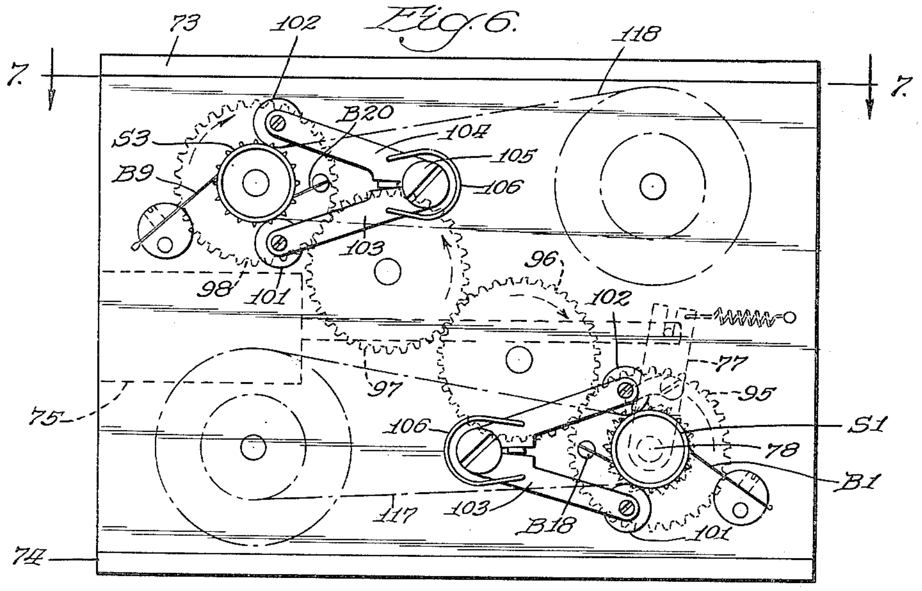
Figure 6 is a front elevational view of the code tape driving unit of the present invention.
Figure 7:
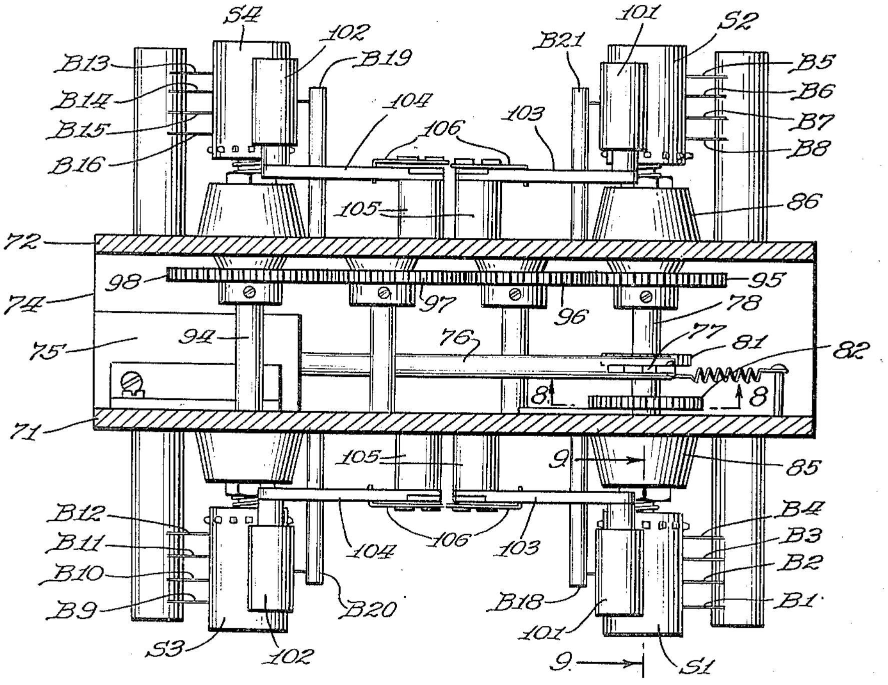
Figure 7 is a plan sectional view of the tape driving unit, and is taken substantially on the plane of the line 7—7 of Figure 6.

Assume, for example, that the message "Cease firing at seven tonight" is to be translated into cryptographic form. This is accomplished merely by typing the message on the keyboard KB, and the message will be reproduced on the typewriter of Figure 1 to appear substantially as shown in Figure 2. The actual functions involved, however, take place in the following sequence: The contacts close, completing a circuit from the power line P1 through the contacts C and to the fifth fixed contact from the left in all of the bank of relays R1 to R13, inclusive. Of these, all will be open except one, as determined by the position of the enciphering tapes, acting through the permutation circuits of Figures 13 and 14. If we assume, for example, that the code tape on the sprocket S1 (now in its initial starting position) energizes only the brush B2, it will be seen that the relay winding r20 will be energized, closing a circuit from the power supply line P2 through the contacts of this relay and through the brush B20 to energize the sprocket S3. This is one of the code tape sprockets and may include any number of perforations from zero to four, in order to energize the brushes 9 to 12, inclusive, in any possible combination.

If, on this sprocket, brushes 9 and 10 are on perforations and the brushes 11 and 12 idle, we will see that the windings r17 and r18 will be energized, while the windings r15 and r16 remain dead. When r18 is energized, the contacts 3R17 and 4R17 will close as the contacts 1R17 and 2R17 open. Simultaneously, the action of winding r18 will open contacts 1R18 and close contacts 2R18. This will complete a circuit from the power line P1 through contacts 2R18, 4R17, 4R16, 5R15 and contacts D10 of the decoding switch to energize the circuit selection contactor winding r11 and close the contacts 1R11 to 13R11, inclusive. Now, since only the fifth contact of each of this bank of relays is energized a circuit will be completed from the power line P1 through the key contacts C to the circuit selector contacts 5R11, through the circuit-splitting contacts C8 and thence through the solenoid winding b and the relay winding r24 back to the power line P2. The action of the solenoid winding b in the typewriting machine of Figure 1 will cause the letter "B" to be typed. Simultaneously, with the typing of the character, the winding r24 acts to open the contacts R24 (Figure 14) and deenergizes the stepping solenoid SS; but since this solenoid shifts the tape sprockets in response to closing of these contacts, the tapes do not move at this particular instant, but remain in fixed position until the circuit is broken by opening of the key contacts. When the circuit is opened by release of the key, winding r24 is deenergized, so that the contacts R24 again close, to actuate the stepper solenoid SS and advance all of the code tapes one notch, bringing new code perforations into position on each of the various tapes.

In typing the word "cease" the actuation of the key "C" is immediately followed by actuation of key "E." This energizes the circuit leading to the fourth stationary contact in each of the thirteen relays R1 to R13, inclusive. If, at this time, the tape on sprocket S1 has advanced to a position with a perforation only below brush B1, it will be seen that the circuit from line P1 will be completed through the brushes B17 and B1 to energize the relay winding r21. This will complete a circuit line L2 through the brush B21 to energize the sprocket S2. If we assume that only the brush B5 is energized, it will be seen that the permutably operable contactor windings r15, r16 and r17 will remain dead, while the winding r18 will be energized. This will cause the contacts 1R18 to open and contacts 2R18 to close, but will leave the circuit of Figure 13 otherwise in the condition shown. Thus, a circuit will be completed from line P1 through contacts 2R18, 2R17, 3R16 and 3R15 to the contacts D6 of the decoding switch, and thence to the winding r7. When the winding r7 is energized the thirteen contacts are closed (Figure 12), but since only the fourth contact from the left is energized, the circuit from line P1 and key contact E is completed only through contacts 4R7 and thence through the circuit-splitting contacts C11 to the solenoid winding m. This winding is also in series with the relay winding r24, which again functions to open the contacts R24 (Figure 14). The letter "M" is thus typed, representing the character "E," and when the circuit is broken by the opening of the key contacts the stepper solenoid SS is again energized to advance the sprockets another notch.

The next key depressed corresponds to the letter "A," which closes the contacts Q of the keyboard and simultaneously acts through the bar 64 to break the contacts 61—62 of the circuit-splitting control system and close contacts 61—63. Now, the first stationary contact in each of the contactors R1 to R13 is energized, and a circuit is also completed from line P1 through the contacts 2R22 and 63—61 to the winding C of the circuit-splitting contactor. This winding, when energized, breaks the contacts C1 to C13, inclusive, and closes contacts C14 to C26, inclusive (Figure 12). Assuming that the movement of the selector tape on the sprocket S1 has now energized the brush B3, it will be seen that a circuit from line P1 is completed through this brush to the relay winding r19 so that the contacts of this have closed and energized the sprocket S4 through the brush B19. If we further assume that this sprocket is in a position where none of its brushes are energized, it will be seen that the windings r15, r16, r17 and r18 will remain dead and the contacts of the permutation circuit will remain in the condition shown in Figure 13. Thus, a circuit will be completed from line P1 through the contacts 1R18, 1R17, 1R16 and 6R15 to the winding r1 and back to line P2. This closes contacts 1R1 to 13R1, inclusive, but since only the first of the stationary contacts of each of the relays is energized, the circuit will be completed only through contacts 1R1 through the circuit-splitting contacts C1, so that the solenoid winding q is energized and the circuit again completed through the relay winding r24 to the line P2. This causes the character "Q" to be typed, representing the letter "A." When the circuit is again broken, the stepper solenoid again moves ahead to bring the code tapes to their next position.

The next key to be depressed closes the key contacts "S" which energizes the third contact from the left in each of the circuit selection contactors R1 to R13, inclusive, in the manner heretofore described. Let us assume, however, that in this instance the tape on sprocket S1 has moved to a position wherein brushes B3 and B4 are both energized. A circuit will be completed from line P1 through brush B3 to the relay r19 and back to line P2, and a second circuit will be completed from the brush B4 through the circuit-splitting relay winding r22 and back to line P2. The contacts of relay r19 close and energize the brush B19 of sprocket S4 while the winding R22 will cause the code operated circuit-splitting control contacts 2R22 to open as the contacts 1R22 close (Figure 12). Now, since the key contacts S are closed and the contacts 61—62 of the circuit-splitting control are still in engagement, a circuit is completed from line P1 through the contacts 1R22 and 61—62 to energize the winding C. This opens the contacts C1 to C13 of the circuit splitting contactor, and closes contacts C14 to C26. If we now assume that the tape on the sprocket S4 has perforations under all of the brushes B13 to B16, inclusive, it will be apparent that windings r15, r16, r17 and r18 will all be energized and all of the shiftable contacts of the contactors R15, R16, R17 and R18 will be shifted into the opposite positions from those of Figure 13. It follows then that a circuit will be completed from line P1 to contacts 2R18, 4R17, 8R16 and contacts D12 of the decoding switch DS, to energize the winding r13. This closes all the contacts 1R1 to 1R13, inclusive, but since only the third of the stationary contacts is energized through the key contacts S the circuit will be completed only through contact 3R13. This leads through contacts C17 (which have closed by the function of winding C) to the solenoid winding d, and thence back through the relay winding r24 to line P2, causing the letter "D" to be typed representing the letter "S."

This procedure follows until the entire message is encoded. It is to be noted, however, that while any given letter of the text of a message is ordinarily represented by some other letter of the alphabet, yet under certain conditions it may remain unchanged. This would happen, for example, if the next letter of the message, which is "E," was struck when the permutation circuits had closed contactor R1. Then the circuit would be established through contacts 4R1 and C4 to the solenoid e.

It is also to be noted that each time one of the key contacts is closed and a solenoid is energized to actuate one of the key bars 14 (Figure 1), the mechanism not only operates to type the character, but in addition the arm 31 acts through the plate 32, the lever 47 and link 46 to move the dog 44 upwardly, advancing the tape one notch and preparing for printing of the next letter. When, however, the movement of the sprocket teeth 42 and 43 reaches a point at which the dog 48 engages one of the notches 43, the longer stroke of the link 51 and lever 52 will cause the mechanism to automatically advance a double space. This happens every sixth stroke of the machine, and functions to break up the coded message into groups of five letters, as indicated in Figure 2. This makes for convenience in translating and is of advantage if the coded message is transmitted by other means, as by telegraph, for example.

To decipher a message, the sprockets S1, S2, S3 and S4 are reset to their original starting position by grasping the outer end of each sprocket 111 (Figure 9) and moving the sprocket inwardly sufficiently to disengage the teeth 114 from the teeth 115. The sprocket is then rotated to the initial starting position, and the teeth allowed to reengage. The decoding switch DS (Figure 13) is shifted from the position shown to its opposite position, opening the contacts D1 to D12, inclusive, and closing contacts D13 to D24. This, in effect, reverses the position of the circuit selector windings *r1* to *r13*, inclusive. The message is then decoded by simply typing the cryptogram as it appears in Figure 2, for example, and the mechanism will automatically translate the message into plain text, but broken into five-letter groups, as illustrated in Figure 3.

The steps of the decoding process are as follows: The first letter of the cryptogram being "B" will close the key contacts B (Figure 12) and complete a circuit to the eighth selector contact of each of the contactors R1 to R13. It will be remembered that the tapes are now in their original starting positions wherein a circuit was previously established through the contacts 2R18, 4R17, 4R16 and 5R15 to energize the decoding switch contacts D10 and energize the winding *r11* (Figure 14). When the position of the decoding switch is reversed, however, the contacts D10 are opened and the contacts D22 closed, so that the winding *r11* is dead and the winding *r4* becomes energized. This closes the circuit from key contact B through contacts 8R4 and thence through the contacts C5 to energize the solenoid *c* and type the letter "C" on the tape. As the circuit through the solenoid *c* is broken by lifting the key contacts B, the winding *r24* permits the contacts R24 (Figure 14) to close and advance the sprockets and code tapes to the next position which (in enciphering the letter "E"), had energized the winding *r7*. Now, however, the decoding switch has been reversed, so that the circuit instead of being completed through the decoding switch contacts D6 to the winding *r7* will now be completed through the decoding switch contacts D18 to energize the contactor windings *r8*.

The second letter, "M," is next struck and a circuit is completed through the key contacts M and circuit selector contact 11R8 to the circuit-splitting contacts *c4* and thence through the solenoid winding *e*, resulting in the translation of the letter "M" to the letter "E," which it represented.

The same procedure is followed as to the next letter, by depressing the key to close the key contact Q which has heretofore represented the letter "A." At this time the code tapes will have advanced another notch to the position in which the contactor R1 was closed. It will be seen, by inspection of Figure 13, that the connection to this contactor is not affected by the operation of the decoding switch; and it follows that it will again be closed. The circuit is then completed from the contacts Q through the contacts 1R1 and thence to the circuit-splitting contactor, but the position of this contactor has now been changed by the functioning of the winding *r22* (Figure 14), so that the circuit is completed through contacts c14 and through the solenoid winding *a*.

The letter "D" is next translated in the same manner, and since in the original encoding of this letter a permutation circuit was completed through the decoding switch contacts D12 to close the contactor R13, it will be seen that the circuit will now be completed through the contacts D24 to energize the winding *r2* and thus close the contactor R2 (Figure 12). This will complete a circuit from the key contacts D through the contacts 4R2 and thence through the circuit-splitting contactor contacts C3 to the solenoid winding *s*. This process is repeated until the entire message is translated to plain text.

From the foregoing, it will be seen that the teachings of the present invention provide a relatively simple means for automatically translating a message in plain text into a cryptogram wherein the frequency of recurrence of the various characters bears no relationship to the frequency of recurrence of the letters of the original message.

Further, this object is accomplished by a device in which the enciphering key is made up of different code record tapes interrelated so that they effect self-permutation, and thus in effect provide an enciphering key of almost infinite length. This means that there is no possibility of cyclic repetition of the key, even after continuous use over a period of years; and it follows that the messages will be encoded in a manner so obscure as to render deciphering by usual methods beyond the realm of mathematical possibility.

It has been mentioned, however, that it is a further object of the invention to provide a machine of the character noted, wherein the machine may be instantly disabled; so that even though the apparatus should fall into the hands of persons seeking to break the code it would be extremely difficult, if not impossible, for them to determine the coding arrangement from the physical apparatus. It is noted in this connection that this object may be accomplished by merely shifting the various sprockets to throw the several code tapes out of their predetermined relationship; but other more conveniently operated means have also been provided, as best shown in Figure 15. In this figure, it will be seen that the leads from the brushes B1, B2 and B3 of the sprocket S1 extend to the three poles X1, X2 and X3 of a six-position switch XX, so that by shifting the switch to any one of its positions the circuits between the brushes and the relay windings *r19*, *r20* and *r21* are altered to energize different sprockets, in response to the energization of the several brushes. Similarly, the leads to the relay windings *r16*, *r17* and *r18* are taken to the three poles Y1, Y2 and Y3 of a five-position switch YY, which alters the interconnection between the brushes and the windings so that any one of the three sets of brushes may actuate any one of the windings.

Thus, when the apparatus is in use by an operator having knowledge of the proper position of each of these switches, it will function in the intended manner. However, by merely throwing one or both of these switches to some other position, the functioning of the mechanism will become completely confused and thrown out of predetermined order. It follows that, in practical use, it is unnecessary to leave the apparatus unattended and in operating condition at any time, since the switches XX and YY need only be moved to their proper positions when actual enciphering or deciphering is in progress.

The mechanism here shown thus accomplishes the objects of the invention in a relatively simple manner, since it encodes the message by means of an enciphering key of almost infinite length, employing any one of the letters of the alphabet to represent itself or any other; and greatly reduces the complexity of the mechanism and the number of electrical contactors necessary for performance of the enciphering and deciphering functions; and automatically breaks the enciphered cryptogram into spaced groups of letters as the enciphering proceeds.

Having thus described the invention, what I claim as new and desire to protect by United States Letters Patent is:

1. In a cryptographic apparatus including a typewriting device having a multiplicity of type bars corresponding to the letters of an alphabet and a type actuating winding associated with each of the type bars, the combination of a manually operable key for each character of the alphabet and a bank of keyboard contacts, each arranged to be actuated by either of a pair of different keys; a bank of circuit selector contactors equal in number to the number of keyboard contacts, and each having paired contacts equal in number to the keyboard contacts; a plurality of permutably operable contactors adapted to close only one of the circuit selector contactors; and a circuit-splitting contactor comprising a double throw switch with poles equal in number to the circuit selector contactors, and adapted to alternately complete a circuit from each one of the circuit selector contactors to either of two type actuating windings; together with a single pair of circuit-splitting contacts responsive to the actuation of one of each pair of the keyboard contacts to actuate the circuit-splitting contactor and shift its contacts between its two alternate positions.

2. In a cryptographic apparatus including a typewriting device having a multiplicity of type bars corresponding to the letters of an alphabet and a type actuating winding associated with each of the type bars; the combination of a manually operable key for each character of the alphabet and a bank of keyboard contacts, each arranged to be actuated by either of a pair of different keys; a bank of circuit selector contactors equal in number to the number of keyboard contacts, and each having paired contacts equal in number to the keyboard contacts; a plurality of permutably operable contactors adapted to close only one of the circuit selector contactors; means including at least one record provided with code elements effective to control the actuation of the permutably operable contactors, and a circuit-splitting contactor, comprising a double throw switch with poles equal in number to the circuit selector contactors, and adapted to alternately complete a circuit from each one of the circuit selector contactors to either of two type actuating windings; together with circuit-splitting contacts responsive to the actuation of at least some of the keys of the keyboard to actuate the circuit-splitting contactor and shift its contacts between its two alternate positions; and additional means to actuate the circuit-splitting contactor, said additional means including a contactor controlled by the code elements of a record.

3. In a cryptographic apparatus including a typewriting device with a mechanically operable type bar for each letter of an alphabet, a type actuating winding to actuate each type bar, and a keyboard having a key for each letter of the alphabet; the combination of a plurality of keyboard contacts responsive to manual actuation of the keys; a plurality of circuit selector contactors adapted to complete a circuit from the keyboard contacts to any one of the type actuating windings; together with a plurality of permutably operable contactors to control the actuation of the circuit selector contactors; a plurality of separate and independent enciphering records and record responsive contactors, each provided with instrumentalities for governing the positions of the permutably operable contactors in irregularly variable sequence and thus translating the characters of the actuated keys into characters printed on the machine in accordance with the position of the individual record with respect to its contactor; and means to selectively energize the record responsive contactors of any one of the several enciphering records in irregularly variable sequence.

4. In a cryptographic apparatus including a typewriting device with a mechanically operable type bar for each letter of an alphabet, a type actuating winding to actuate each type bar, and a keyboard having a key for each letter of the alphabet; the combination of a plurality of keyboard contacts responsive to manual actuation of the keys; a plurality of circuit selector contactors adapted to complete a circuit from the keyboard contacts to any one of the type actuating windings; together with a plurality of permutably operable contactors to control the actuation of the circuit selector contactors; a plurality of separate and independent enciphering records and record responsive contactors, each provided with instrumentalities for governing the positions of the permutably operable contactors in irregularly variable sequence and thus translating the characters of the actuated keys into characters printed on the machine in accordance with the position of the individual record with respect to its contactor; together with means to periodically shift the positions of each of the records with respect to its responsive contactors to effect self-permutation of the several enciphering records.

5. In a cryptographic apparatus including a typewriting device with a mechanically operable type bar for each letter of an alphabet, a type actuating winding to actuate each type bar, and a keyboard having a key for each letter of the alphabet; the combination of a plurality of keyboard contacts responsive to manual actuation of the keys; a plurality of circuit selector contactors adapted to complete a circuit from the keyboard contacts to any one of the type actuating windings; together with a plurality of permutably operable contactors to control the actuation of the circuit selector contactors; a plurality of separate and independent enciphering records and record responsive contactors, each provided with instrumentalities for governing the positions of the permutably operable contactors in irregularly variable sequence and thus translating the characters of the actuated keys into characters printed on the machine in accordance with the position of the individual record with respect to its contactor, and a record selector mechanism comprising a separate record and record responsive contactors to selectively energize the record responsive contactors of any one of the several enciphering records in irregularly variable sequence; together with means to periodically shift the positions of each of the records with respect to its record responsive contactors to effect self-permutation of the several enciphering records.

6. In a cryptographic apparatus including a typing mechanism with a plurality of type bars and a type actuating winding associated with each type bar, and a keyboard having a key corresponding to each type bar; the improvement that resides in the provision of an enciphering circuit including, in combination, a set of circuit selector contactors, a set of permutably operable contactors adapted to selectively close any one of the circuit selector contactors, and enciphering devices for governing the actuation of the permutably operable contactors, together with a circuit-splitting contactor adapted to interconnect each of the circuit selector contactors to a plurality of the type actuating windings; and means to actuate the circuit-splitting contactor including a pair of contacts manually operable by at least some of the keyboard keys.

7. In a cryptographic apparatus including a typing mechanism with a plurality of type bars and a type actuating winding associated with each type bar, and a keyboard having a key corresponding to each type bar; the improvement that resides in the provision of an enciphering circuit including, in combination, a set of circuit selector contactors, a set of permutably operable contactors adapted to selectively close any one of the circuit selector contactors, and enciphering devices for governing the actuation of the permutably operable contactors, together with a circuit-splitting contactor adapted to interconnect each of the circuit selector contactors to a plurality of the key actuating windings; and means to actuate the circuit-splitting contactor including a pair of contacts manually operable by at least some of the keyboard keys: with additional means to actuate the circuit-splitting contactor in response to the enciphering devices.

ARTHUR H. BUCKLEY.

REFERENCES CITED

The following references are of record in the file of this patent:

UNITED STATES PATENTS

| Number | Name | Date |
|---|---|---|
| 1,357,557 | Hart | Nov. 2, 1920 |
| 2,151,453 | Walker | Mar. 21, 1939 |
| 2,377,205 | Buckley | May 29, 1945 |
| 2,425,518 | Doty | Aug. 12, 1947 |